(12) United States Patent
Poole (10) Patent No.: US 10,345,469 B2
(45) Date of Patent: Jul. 9, 2019

(54) DEVICE AND METHOD FOR CORRECTING SEISMIC DATA FOR VARIABLE AIR-WATER INTERFACE (71) Applicant: CGG SERVICES SAS, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 101 days.

(21) Appl. No.: 15/409,938

(22) Filed: Jan. 19, 2017

(65) Prior Publication Data
US 2017/0219732 A1  Aug. 3, 2017

Related U.S. Application Data (60) Provisional application No. 62/288,640, filed on Jan. 29, 2016.

(51) Int. Cl.
G01V 1/36    (2006.01)
G01V 1/38    (2006.01)
(Continued)

(52) U.S. Cl.
CPC ........... *G01V 1/36* (2013.01); *G01V 1/282* (2013.01); *G01V 1/301* (2013.01); *G01V 1/364* (2013.01);
(Continued)

(58) Field of Classification Search
CPC .......... G01V 1/38; G01V 1/282; G01V 1/301; G01V 1/364; G01V 2210/56; G01V 2210/532; G01V 2210/614
(Continued)

(56) References Cited

U.S. PATENT DOCUMENTS 8,593,904 B2  11/2013 Soubaras
8,837,259 B2   9/2014 Ruet et al.
(Continued)

FOREIGN PATENT DOCUMENTS

WO  2015011160 A1  1/2015
WO  2016038458 A2  3/2016
WO  2016110738 A1  7/2016

OTHER PUBLICATIONS

L. Amundsen et al., "Rough-sea Deghosting of Streamer Seismic Data Using Pressure Gradient Approximations", Geophysics, Jan.-Feb. 2005, vol. 70, No. 1, pp. V1-V9.
(Continued)

Primary Examiner — Daniel L Murphy
(74) Attorney, Agent, or Firm — Patent Portfolio Builders PLLC (57) ABSTRACT Computing device, computer instructions and method for correcting an image, of a surveyed surface, due to a free-surface reflection. The method includes calculating a free surface reflection operator for a seismic source displaced in water based on a position of the source, and an air-water interface datum; receiving recorded seismic data d recorded with seismic sensors (r), wherein the recorded seismic data is associated with a pressure and/or a particle motion produced by a seismic wave in earth; correcting the recorded seismic data d based on the free surface reflection operator to obtain transformed seismic data; and generating an image of the surveyed subsurface, based on the transformed seismic data, wherein the image is indicative of various layers of the earth. The free surface reflection operator varies while a source signal is being emitted by the source.

20 Claims, 8 Drawing Sheets (51) Int. Cl.
*G01V 1/28* (2006.01)
*G01V 1/30* (2006.01)

(52) U.S. Cl.
CPC .......... *G01V 1/38* (2013.01); *G01V 2210/532* (2013.01); *G01V 2210/56* (2013.01); *G01V 2210/614* (2013.01)

(58) Field of Classification Search
USPC .......................................................... 367/24
See application file for complete search history.

(56) References Cited

U.S. PATENT DOCUMENTS

| | | |
|---|---|---|
| 2013/0028049 A1 | 1/2013 | Pan |
| 2014/0016436 A1 | 1/2014 | Söllner et al. |
| 2014/0043936 A1 | 2/2014 | Poole |
| 2015/0131409 A1* | 5/2015 | Abma ................... G01V 1/003 367/7 |
| 2016/0187513 A1 | 6/2016 | Poole et al. |

OTHER PUBLICATIONS

B. Hung et al., "Shallow Water Demultiple", Australian Society of Exploration Geophysicists, ASEG 2010, Syndey, Australia, pp. 1-4.
E. Krach et al., "Sea Surface Shape Derivation Above the Seismic Streamer", EAGE 64th Conference & Exhibition, Florence, Italy, May 27-30, 2002.
O. Orji et al., "Imaging the Sea Surface Using a Dual-sensor Towed Streamer", Geophysics, Nov.-Dec. 2010, vol. 75, No. 6, pp. V111-V118.
G. Poole et al., "Inversion-driven Free Surface Multiple Modelling Using Multi-order Green's Functions", SEG Annual Meeting, New Orleans, Louisiana, 2015, SEG Technical Expanded Abstracts, pp. 4428-4432.
J.O.A. Robertson et al., "Rough-sea Deghositing Using a Single Streamer and a Pressure Gradient Approximation", Geophysics, Nov.-Dec. 2002, vol. 67, No. 6, pp. 2005-2011.
P. Wang et al., "Model-based Water-layer Demultiple", SEG Annual Meeting, San Antonio, Texas, 2011, SEG Technical Expanded Abstracts, pp. 3551-3555.
Extended European Search Report dated Jun. 19, 2017 in related EP Application No. 17305077.4 (WO 2015/011160 previously cited in IDS on Jan. 19, 2017).

* cited by examiner

DEVICE AND METHOD FOR CORRECTING SEISMIC DATA FOR VARIABLE AIR-WATER INTERFACE

CROSS-REFERENCE TO RELATED APPLICATIONS

The present application claims the benefit of priority of U.S. Provisional Application 62/288,640, having the title "Method to correct for variable sea surface during non-impulsive emission," filed on Jan. 29, 2016, the entire contents of which are incorporated herein by reference.

BACKGROUND

Technical Field

Embodiments of the subject matter disclosed herein generally relate to methods and systems and, more particularly, to mechanisms and techniques for correcting seismic data, collected with one or more marine seismic sensors, and generating an improved image of the surveyed subsurface.

Discussion of the Background

Marine seismic data acquisition and processing generate a profile (image) of the geological structure (subsurface) under the seafloor. The image represents a geophysical parameter of the earth. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

Figure 1:
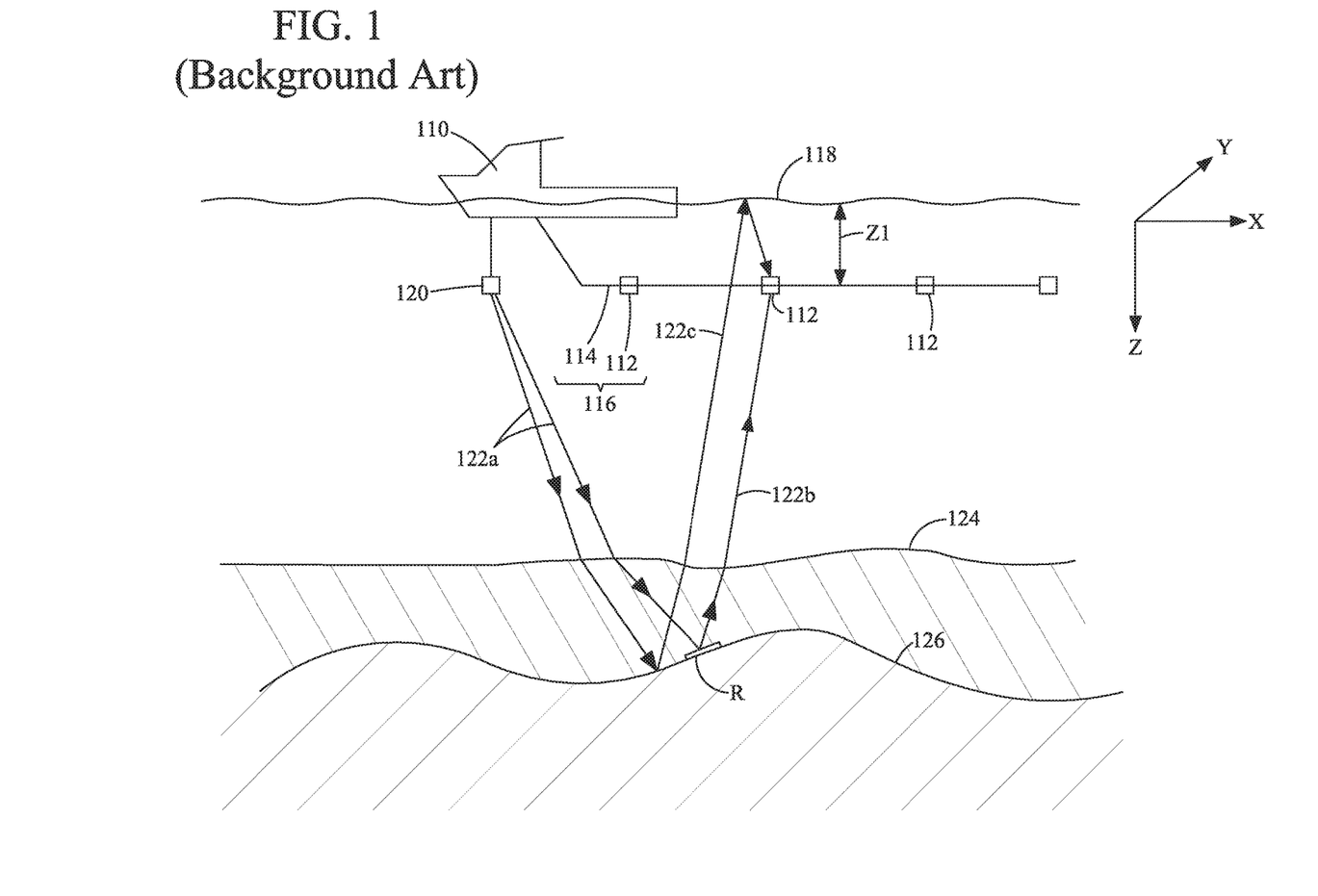
FIG. 1 is a schematic diagram of a conventional seismic data acquisition system having a horizontal streamer.

During a seismic gathering process, as shown in FIG. 1, a vessel 110 tows plural detectors 112. The plural detectors 112 are disposed along a cable 114. Cable 114 together with its corresponding detectors 112 are sometimes referred to, by those skilled in the art, as a streamer or antenna 116. Vessel 110 may tow plural streamers 116 at the same time. The streamers may be disposed horizontally, i.e., lying at a constant depth $z_1$ relative to the surface 118 of the ocean. Also, the plural streamers 116 may form a constant angle (i.e., the streamers may be slanted) with respect to the surface of the ocean, or the streamers may have a curved shape, as disclosed, for example, in U.S. Pat. No. 8,593,904.

Still with reference to FIG. 1, vessel 110 also tows a seismic source 120 configured to generate an acoustic wave 122a. Acoustic wave 122a propagates downward and penetrates the seafloor 124, eventually being reflected by a reflecting structure 126 (reflector R). The reflected acoustic wave 122b propagates upward and is detected by detector 112. For simplicity, FIG. 1 shows only two paths 122a corresponding to the acoustic wave. However, the acoustic wave emitted by the source 120 may be substantially a spherical wave, e.g., it propagates in all directions starting from the source 120. Parts of the reflected acoustic wave 122b (primary or up-going wave) are recorded by the various detectors 112 (the recorded signals are called traces) while parts of the reflected wave 122c pass detectors 112 and arrive at the water surface 118. Since the interface between the water and air is well approximated as a quasi-perfect reflector (i.e., the water surface acts as a mirror for the acoustic waves), the reflected wave 122c is reflected back toward the detector 112 as shown by wave 122d in FIG. 1. Wave 122d is normally referred to as a ghost wave (or down-going wave) because this wave is due to a spurious reflection. The ghosts are also recorded by the detector 112, but with a reverse polarity and a time lag relative to the primary wave 122b. The degenerative effect that the ghost arrival has on seismic bandwidth and resolution is known. In essence, interference between primary and ghost arrivals causes notches, or gaps, in the frequency content recorded by the detectors.

Seismic source 120 may be an impulsive source, e.g., an air gun, or a vibratory source, e.g., a vibratory source element as described in U.S. Pat. No. 8,837,259 (herein the '259 patent), the entire content of which is incorporated herein by reference.

The traces recorded by sensors 112 may be used to determine an image of the subsurface (i.e., earth structure below surface 124) and to determine the position and presence of reflectors 126. However, the ghosts disturb the accuracy of the final image of the subsurface and, for at least this reason, various methods exist for removing the ghosts, i.e., deghosting, from the results of a seismic analysis.

Over the years, many algorithms have been developed to suppress the ghost reflections. This process is commonly known in the art as deghosting, ghost wave-field elimination or wave-field separation. Many of these algorithms assume that the reflecting air-water interface 118 is at a constant datum. In fact, various factors (e.g., wind, air pressure, earthquakes, moving vessels, etc.) cause the air-water interface to vary in time and space. The air-water interface is thus better described by a wave than the traditional flat, horizontal, plane. The wave's shape can cause the travel-time (time to travel from the source 120 to sensor 112) of the ghost reflection 122d to deviate from the traditionally calculated travel-time (with flat air-water interface) by an unknown time delay. As a result, the quality of the wave-field separation can be degraded. This affects the quality of further seismic processing and ultimately, the final image of the earth's reflectivity.

A method for determining the air-water interface shape is disclosed in Kragh et al., 2002, "Sea surface shape derivation above the seismic streamer," 64th Meeting, EAGE, Expanded Abstracts, A007. According to this method, very low frequencies (<0.5 Hz) of the pressure wave-field need to be recorded. These recordings are then used to invert for wave heights. However, recording such low frequencies requires a modified acquisition set up, which is undesirable.

Robertsson et al., 2002, "Rough sea deghosting using a single streamer and a pressure gradient approximation," Geophysics, 67, 2005-2011, performs a ghost correction on single sensor (pressure) data by estimating the vertical pressure gradient. This process requires continuous measurements of the wave height above the streamer. The approach is limited to frequencies below the first ghost notch.

Amundsen et al., 2005, "Rough sea deghosting of streamer seismic data using pressure gradient approximations," Geophysics, 70, no. 1, V1-V9, derive an improved estimate of the vertical pressure gradient (from Robertsson et al. (2002)) using a binomial series expansion. As above, this approach requires continuous measurements of wave height along the streamer, which is not easy to obtain.

Orji et al., 2010, "Imaging the sea surface using a dual-sensor towed streamer," Geophysics, vol. 75, no. 6, pp. V111-V118, image the air-water interface by extrapolating the separated up-going and down-going wave fields (obtained from a multi-sensor streamer) upwards and performing an imaging condition. This imaging step allows for an estimation of wave height.

CGG (which is the assignee of this patent application) has developed over time various techniques for handling a changing air-water interface while acquiring seismic data. Some of these techniques are described in U.S. patent application Ser. No. 13/927,566, Publication No. US 2014/0043936 (reference A herein), U.S. patent application Ser. No. 14/902,619, International Publication No. WO2015/011160 (reference B herein), and International Patent Application Serial Nos. PCT/IB2015/002626 (reference C herein) and PCT/IB2015/001930 (reference D herein).

According to these CGG references, the process of designature (the recorded traces include a combination of the desired earth reflectivity and the source signature, or far-field signature; it is desired to remove the far-field signature from the recorded seismic data, a process known as "designature") may be applied in 1D (1 dimensional), 2D, or 3D as described by reference (A). The designature approach described in reference (A) may optionally compensate for one or more of the source emissions (e.g., gun response), source array, and free-surface ghost. In the case of acquiring data where the air-water interface may not be adequately described by a horizontal plane, the methodology may be modified accordingly as described in reference (D). References (A) and (D) discuss the case of impulsive sources (e.g., airgun arrays). In the case of non-impulsive emission, e.g., when a vibratory source is used, other designature approaches have been proposed, for example, references (B) and (C).

Reference (D) describes how to compensate for the effects of a static array and static sea datum (which may be valid for an impulsive source). In the case of a non-impulsive source (e.g., marine vibrator), the sea state and/or source array may vary during the emission (which could be from several seconds to minutes or hours in duration).

However, all these methods require continuous measurements of the wave height along the streamer or a substantial modification of the acquisition set up or the use of an impulsive source, neither of which is desired. Thus, there is a need for methods that use the correct for the source depth and/or the source ghost's travel-time, that do not require a modification of the existing acquisition set up and that accounts for the fact that a vibratory source's position changes with the water surface while the seismic waves are generated. Accordingly, it would be desirable to provide systems and methods that have such capabilities.

SUMMARY

According to an exemplary embodiment, there is a method for correcting an image, of a surveyed surface, due to a free-surface reflection. The method includes calculating a free surface reflection operator for a seismic source displaced in water based on a position of the source, and an air-water interface datum; receiving recorded seismic data d recorded with seismic sensors (r), wherein the recorded seismic data is associated with a pressure and/or a particle motion produced by a seismic wave in earth; correcting the recorded seismic data d based on the free surface reflection operator to obtain transformed seismic data; and generating an image of the surveyed subsurface, based on the transformed seismic data, wherein the image is indicative of various layers of the earth. The free surface reflection operator varies while a source signal is being emitted by the source.

According to another embodiment, there is a computing device for correcting an image, of a surveyed surface, due to a free-surface reflection. The computing device includes a processor for calculating a free surface reflection operator for a seismic source displaced in water based on a position of the source, and an air-water interface datum, and an interface connected to the processor. The interface is configured to receive recorded seismic data d recorded with seismic sensors (r), wherein the recorded seismic data is associated with a pressure and/or a particle motion produced by a seismic wave in earth. The processor is further configured to correct the recorded seismic data d based on the free surface reflection operator to obtain transformed seismic data; and generate an image of the surveyed subsurface, based on the transformed seismic data, wherein the image is indicative of various layers of the earth. The free surface reflection operator varies while a source signal is being emitted by the source.

According to another embodiment, there is a non-transitory computer readable medium that includes computer executable instructions. When the instructions are executed by a processor, a method for processing as noted above is achieved.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic acquisition system that generates seismic data using vibratory source elements. However, the embodiments to be discussed next are not limited to data generated by the vibratory sources, but they may be applied to data generated by impulsive sources that are grouped in an array and are fired in a "popcorn" manner, i.e., various air guns of the array are fired at various times so that a change in the air-water interface impacts differently the energy emission of one source element relative to another in the array.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for correcting recorded seismic data that includes calculating a composite far-field source signature ($f_c$) of a source array based on a position of the source, a source array emission S, and an air-water interface datum, receiving the recorded seismic data d recorded with seismic sensors (r), correcting the recorded seismic data d based on the composite far-field source signature ($f_c$) to obtain transformed seismic data, and generating an image of the surveyed subsurface, based on the transformed seismic data, wherein the image is indicative of a parameter of the earth. The air-water interface may be described by a wave. The term "wave" used herein to describe the deviation of the air-water interface from the flat horizontal plane, which is traditionally associated with the air-water interface, should not be construed in a narrow way to imply only a wave defined by a well-established equation, for example, a sinusoid. While the term "wave" includes such description, it is also intended to include choppy waves, or movements of the air-water interface that cannot be described by a mathematical equation. Thus, the term "wave," when used herein in the context of characterizing the air-water interface, includes any possible shape taken by the air-water interface due to wind, currents, tides, pressure or any other factor.

According to an embodiment, it is possible to estimate a far-field composite signature $f_c$ composed of a primary signal (p) and a ghost (g) signal, for example, described by plane waves, or alternatively, relating to a point receiver located away (e.g., more than 50 m, but preferably in the order of km, e.g., 10 km) from the source array. Note that a source array means a set of source elements, where each source element may be a vibratory source element as discussed in the '259 patent. In one application, the source array may include a mixture of vibratory source elements and air guns. In still another application, the vibratory source elements may have different characteristics (e.g., size, frequency spectrum). In yet another application, the source array includes only impulsive sources that are fired over a long enough time so that a change in the air-water interface influences differently the source signatures from different source elements of the same source array (e.g., popcorn firing of a traditional source array made out of air guns).

The point receiver where the primary signal p and ghost signal g are calculated is described by coordinates ($x_r, y_r, z_r$). The far-field signature f can be calculated based on the following: (1) the emission signal S(t) from each of the N source elements of the source array as function of time; (2) the position ($x_s, y_s, z_s$) of each source element in the source array as a function of time, and (3) the free surface profile ($x_d, y_d, z_d$) of the air-water interface as a function of time. Based on this information, it is possible to calculate the far-field signature f based on various methods, e.g., wave equation modelling (finite difference, finite element), analytical calculations when the exact air-water interface is known, Kirchhoff, beam forming, or diffraction modelling. In the case of a horizontal sea surface, beam forming may be an efficient way of calculating the source ghost. This is because an up-going plane wave leaving the source will have the same slowness as the reflected down-going ghost reflecting. In the case of a non-horizontal sea surface, the up-going plane wave will scatter and spread energy into other plane waves. Never-the-less, this approach may be used to calculate the source far-field signatures or source ghost operators.

Figure 2:
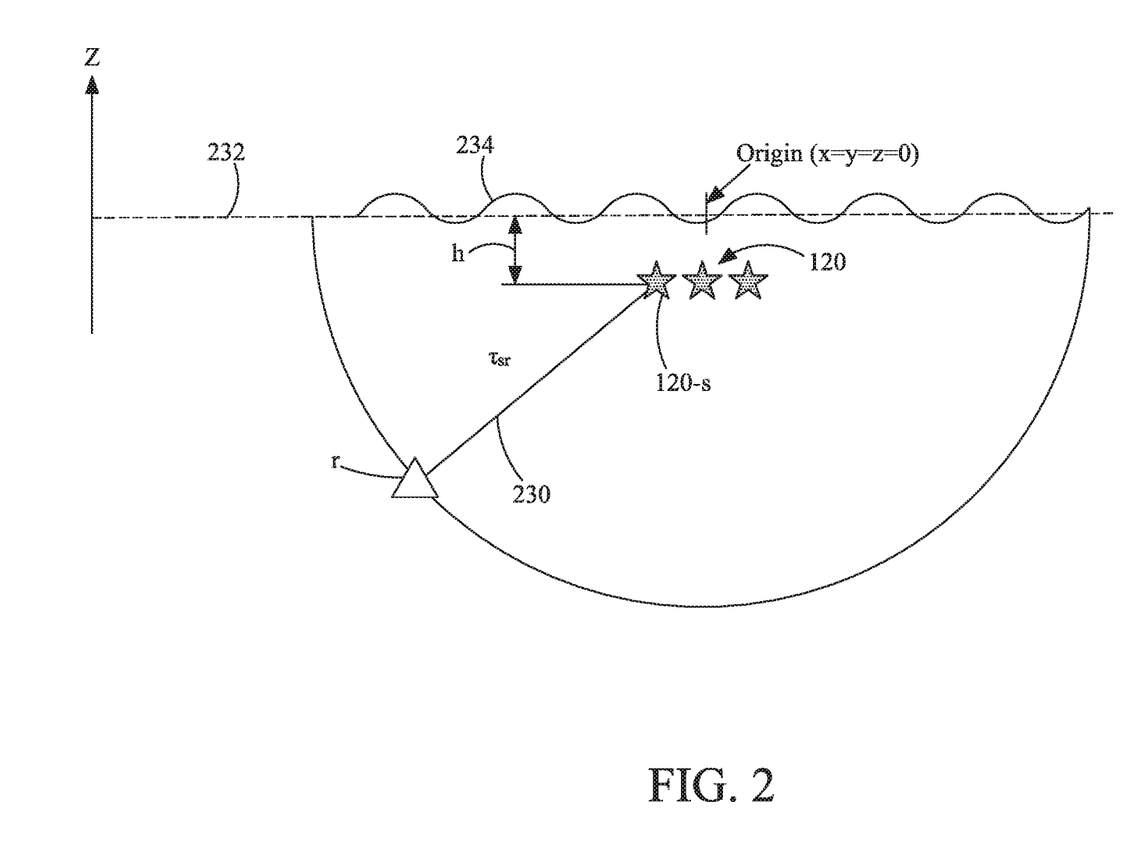
FIG. 2 illustrates a path of the primary signal for a faraway receiver.

The following embodiment, illustrated in FIG. 2, describes a method for calculating the primary (down-going) signal contribution from each source element of the source array to the far-field signature at a given receiver position, considering a fixed non-horizontal air-water interface.

The primary emission signal from each source element may be array formed to calculate a composite primary signal p as described in references (A-D), e.g., $$p(\omega) = \sum_{n=1}^{N} S(n, \omega) e^{-i\omega \tau_p}, \quad (1)$$

$$\omega = 2\pi f,$$

where S(n, ω) is the primary emission contribution from one source element, f is the frequency, n is the index for the source elements, N is the number of the source elements forming the source array, and $\tau_p$ (or $\tau_{sr}$, which means the travel time of a wave propagating directly from the source s to the receiver r) is the travel time from a source element n to the receiver, which may be calculated based on the Euclidean distance between the two elements divided by the water velocity $v_w$ as described by equation:

$$\tau_p = \tau_{sr} = v_w^{-1} \sqrt{(x_s - x_r)^2 + (y_s - y_r)^2 + (z_s - z_r)+^2}$$

A path 230 for an arrival $\tau_{sr}$ from one source element 120-s to one receiver r is shown in FIG. 2. Note that receiver r is located far away from the source 120-s, i.e., at least 50 m. In one embodiment, the receiver is located more than 10 km away. The receiver is also shown in FIG. 2 as being located at a depth larger than a depth h of the source element, where the depth h is about 25 m from a mean sea level 232. If the air-water interface 234 is described by a wave, as illustrated in FIG. 2, then the mean sea level 232 is defined as a plane located at a Z position so that distances between (1) the points of the air-water interface 234 and (2) the corresponding points of the plane, when used to calculate their mean, result in the Z position. In this case, the Z position may be chosen to be zero, meaning that the positions of the points of the air-water interface 234 are scaled accordingly relating to the zero position of the mean. The mean sea level may alternatively be defined by the Geoid, or by the arithmetic mean of hourly water elevations observed over a specific 19 year tidal cycle. For the purpose of this discussion, it is considered that the mean sea level is a reference datum from which the air-water interface can be defined.

For a non-horizontal air-water interface 234, the ghost signal g for the entire source array 120 may also be computed, for example, using diffraction modelling. This calculation will have a contribution from each source element 120-s.

The total ghost signal, g, may be given by the summation (over all source elements N) of arrivals along path 340 (see FIG. 3), from a source element 120-s to all diffraction points (D), and along path 342, from all diffraction points D to the receiver r. Note that paths 340 and 342 illustrate one single possible propagation path of an arrival from source element 120-s to receiver r, after being reflected at point D at the air-water interface 234. In the simplest case, the integral of arrivals over the sea surface may be considered as a spike with a delay relating to the ghost timing, e.g., relating to the earliest arrival. However, this concept may be further extended to produce a non-flat amplitude spectrum describing spectral modifications relating to scattering at the sea surface. In a more general sense, the ghost arrival may relate to a more complex operator which, in extreme cases, may include 'bow-tie' multi-arrival effects relating to strong sea surface disturbances. This latter case could relate to diffraction modelling across the sea surface which will be described later.

However, the summation noted above needs to account for a number of sources (N) within the source array 120 and for all points D for the air-water interface portion 346 considered in these calculations. Those skilled in the art would understand that a size of the air-water interface portion 346 (e.g., radius of about 1 to 5 m) depends with the depth of the target subsurface to be surveyed.

Figure 3:
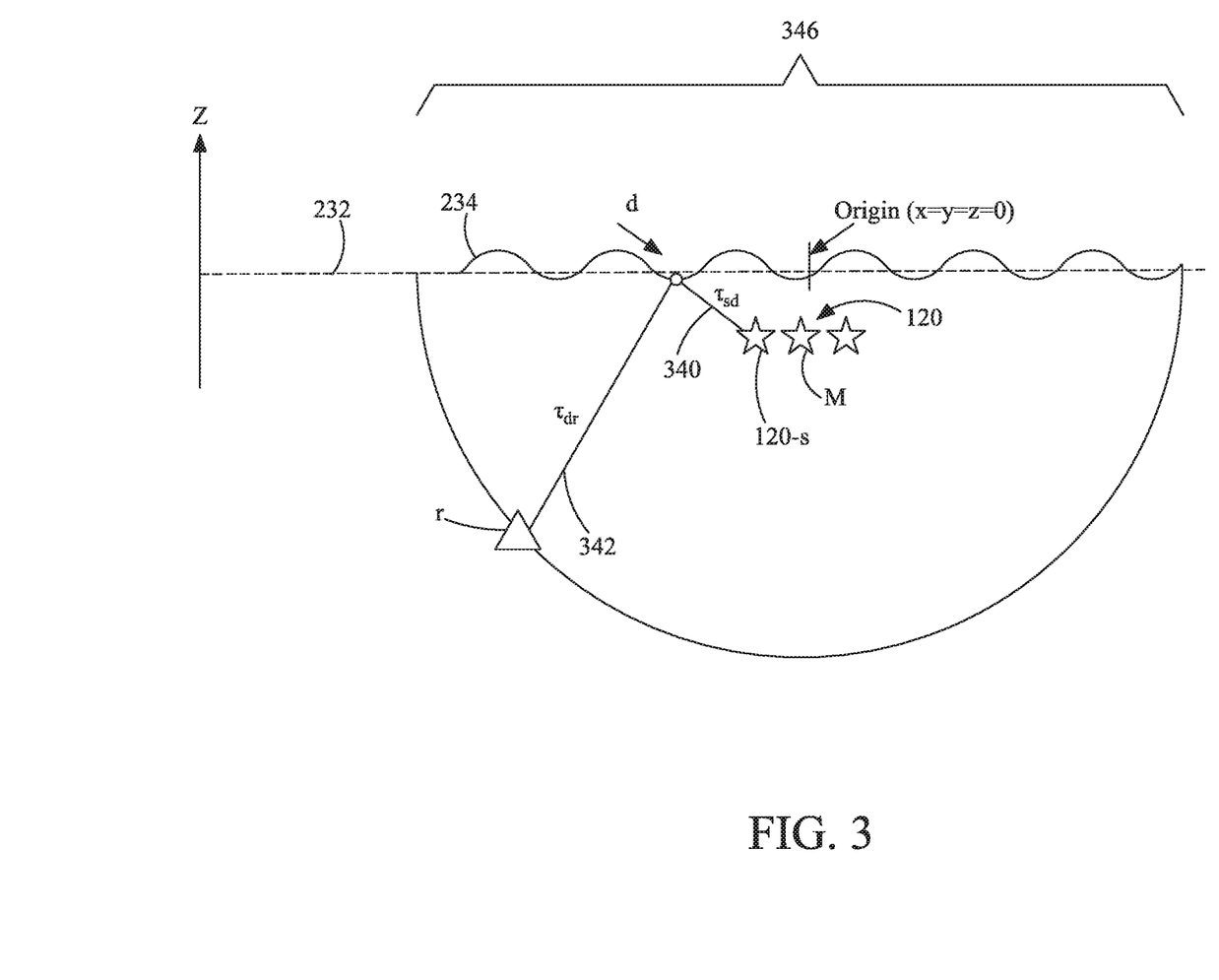
FIG. 3 illustrates a path of the ghost signal, which considers the air-water interface shape, for a faraway receiver.

This summation may be approximated by placing a hypothetical point receiver r at a large distance (similar to the distance discussed with regard to FIG. 2) from the source, as illustrated in FIG. 3.

The total ghost signal g, according to FIG. 3 and the diffraction model, is given by:

$$g(\omega) = Ri\omega \sum_{d=1}^{D} \sum_{n=1}^{N} S(n, \omega) e^{i\omega\tau_g}, \quad (2)$$

where R is the reflection of the air-water interface 234, and the term $i\omega$ is a factor to compensate for phase rotation and spectral shape relating to Kirchhoff summation. Note that the two sums noted above may be replaced by integrals if an analytical approach is used, e.g., a shape of the air-water interface 234 is known more precisely. Note that an integration constant would be required to keep the amplitude of equation (2) consistent with that of equation (1).

The time needed to travel the distance 340, from the source element 120-s to a diffraction point d, followed by the distance 342, from the diffraction point d to the receiver r, is given by:

$$\tau_g = \tau_{sd} + \tau_{dr}.$$

The travel time $\tau_{sd}$ for travelling along distance 340, from the source element 120-s to the diffraction point d, is given by:

$$\tau_{sd} = v_w^{-1} \sqrt{(x_s - x_d)^2 + (y_s - y_d)^2 + (z_s - z_d)^{+2}},$$

and the travel time $\tau_{dr}$ for travelling along distance 342, from the diffraction point d to the receiver r, is given by:

$$\tau_{dr} = v_w^{-1} \sqrt{(x_d - x_r)^2 + (y_d - y_r)^2 + (z_d - z_r)^{+2}}.$$

One will note that both travel times depend on the position of diffraction point d, which changes as the air-water interface changes in time.

The water reflectivity R may often be −1, but may also have a lower magnitude, relating to the energy lost at the reflection or transmitted into the air. It may also take the form of a fuzzy ghost (e.g., Gaussian shape) or frequency dependent ghost (for example, accounting for high frequencies that may be dispersed more by the irregular free surface than the low frequencies).

The above equations may also be written in 2D, where y=0, and the Kirchhoff compensation becomes $\sqrt{i\omega}$. These equations may also be reverse Fourier transformed after calculation, calculated in the time domain, or in another domain. The air-water interface 234 may be described for a large area, or just for a small area, above the source array 120. In some cases, a source depth h may be required for these calculations.

As mentioned previously, alternative methods may be employed to estimate the ghosting function or farfield signature. One such method is wave equation modelling where a non-horizontal free surface may be defined by a sharp density change in the model.

To better understand the influence of the air-water interface's changing shape on the far-field signature, when a vibratory source array is used, it is noted that while the typical impulsive source (i.e., air gun) generates the entire frequency spectrum of the seismic waves in an instant, when the air gun is fired, the typical vibrator source elements generates the frequency spectrum one frequency at a time, i.e., it sweeps the frequency spectrum, which may take up to 10 s. In some cases, this sweep time may be shorter or longer.

However, as the air-water interface shape changes in time, and the vibratory source element needs time to generate all the seismic waves, the shape of the air-water interface changes while the vibratory source element still sweeps the frequency spectrum. This means that for a frequency f1 at the beginning of the spectrum, the shape of the air-water interface is different than for a frequency f2 at the end of the spectrum for a single sweep. This problem does not arise when air guns are used and fired simultaneously or almost simultaneously, as all the seismic waves are generated simultaneously and thus, all the seismic waves "see" the same air-water interface. The situation is different when an array of air guns is fired at different times (e.g., randomly, like the popcorn process), because for this situation, the seismic waves from air gun 1 "see" a different air-water interface than the seismic waves from air gun 2, which is fired later in time than air gun 1.

This is one of the reasons why the known methods for handling the changing air-water interface do not apply to the vibratory sources or air guns fired in a popcorn manner (i.e., the air guns, when fired simultaneously, "see" a single air-water interface, and the slow changing air-water interface does not affect this type of sources).

However, the situation is different for the arrays of vibratory source elements, for which the length of the sweeping time makes the generated seismic waves to encounter different air-water interface shapes.

In one embodiment, a wave equation modelling algorithm may be used to estimate the ghost operator or farfield signature, from a time-variant non-horizontal sea surface. This may involve updating the density model to represent a time variant sea surface as a function of time whilst propagating energy through the model.

Figure 4A:
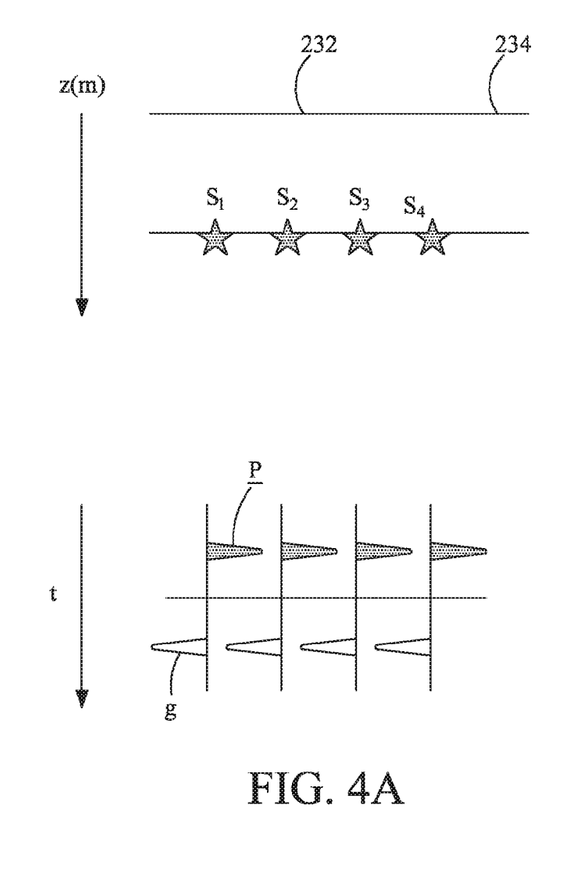
FIGS. 4A-4C illustrate the time alignment of the primary and ghost signals as a function of the positions of the source elements relative to the air-water interface.
Figure 4B:
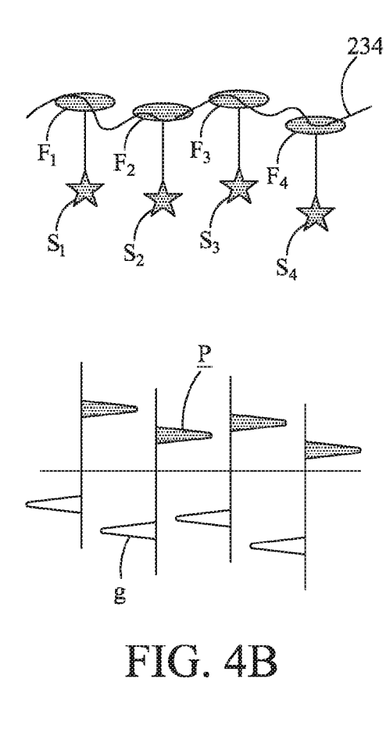
Figure 4C:
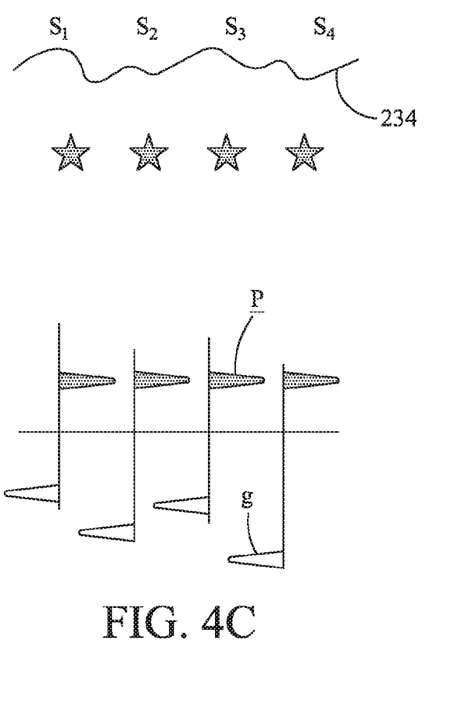

To further illustrate this specific problem for the vibratory sources or arrays of impulsive sources that are fired with large time delays during a single sequence, FIG. 4A shows four source elements S1-S4 being located at the same level below the mean sea level 232 and the air-water interface 234 coinciding with the mean sea level 232. Those skilled in the art would understand that this is an idealized situation, i.e., the ocean water is still, with no waves. For this ideal situation, the primary signal p and the ghost signal g for each source element are aligned in time, as illustrated in FIG. 4A. If the source elements S1-S4 are suspended from corresponding floats F1-F4, as illustrated in FIG. 4B, and the air-water interface 234 is not uniform, then the primary signal p and ghost signal g may experience a time variant shift as the waves (describing the air-water interface) changes in time. For impulsive source data, this could have a similar effect to a static shift from shot to shot. Alternatively, the source elements S1-S4 may all be positioned at a same fixed depth (e.g., defined by hydrostatic equilibrium or fixed relative to the Geoid) as illustrated in FIG. 4C, in which case the primary signal p's timing may be stationary and only the ghost's timing may vary.

The source elements within a source array may all be at the same depth, or they may be at different depths (e.g., although the source elements may be suspended from a same float, they may be positioned at different depths relative to the float). Thus, the timing of the source primary signal and/or ghost signal may additionally be modified to account for these different positions. In addition, the timing for the source primary and/or ghost signals may include tidal corrections.

Any non-corrected source datum (the term "source datum" refers to the position of the source elements relative to the mean sea level 232, over a given time period, for example, a tidal period) or wave height (this term refers to the height/amplitude of a wave that describes the air-water interface 234, relative to the mean sea level 232) effect may result in jitter in the recorded seismic data. To an extent, the jitter may be smeared and averaged during seismic imaging, which may sum data over a Fresnel zone. In a 4D context (i.e., time lapse seismic survey), the water waves will not be consistent from one acquisition to another. Nevertheless, the statistical distribution of the waves may have some similarity, and as such, the post-migration data may have better repeatability than the pre-migration data due to the smearing effect of the residual ghost/statics.

If the far-field signature is calculated as illustrated in FIG. 3, i.e., using a point receiver r a long way from the source s, there may be a time delay of several seconds relating to the distance between the receiver and the source. Thus, in one application, it is possible to time shift the primary signal p' timing to (1) zero seconds, or (2) to a time that corresponds to a distance from origin O in FIG. 3 (see point O above the source centre M at mean sea level 232) to the receiver r. In this way, the primaries have a zero time and the ghosts are further shifted with a corresponding time shift. One way to calculate this time shift may be to divide a direct distance 230 between the source s and receiver r (see FIG. 2) by the water speed, i.e., t=distance/$v_w$=10,000/1,500=6.66 s. The ghost signal arrival may need further correction, for example, by an integration constant. This may be spatially variant, dependent on the spacing between adjacent diffraction points d.

Figure 5:
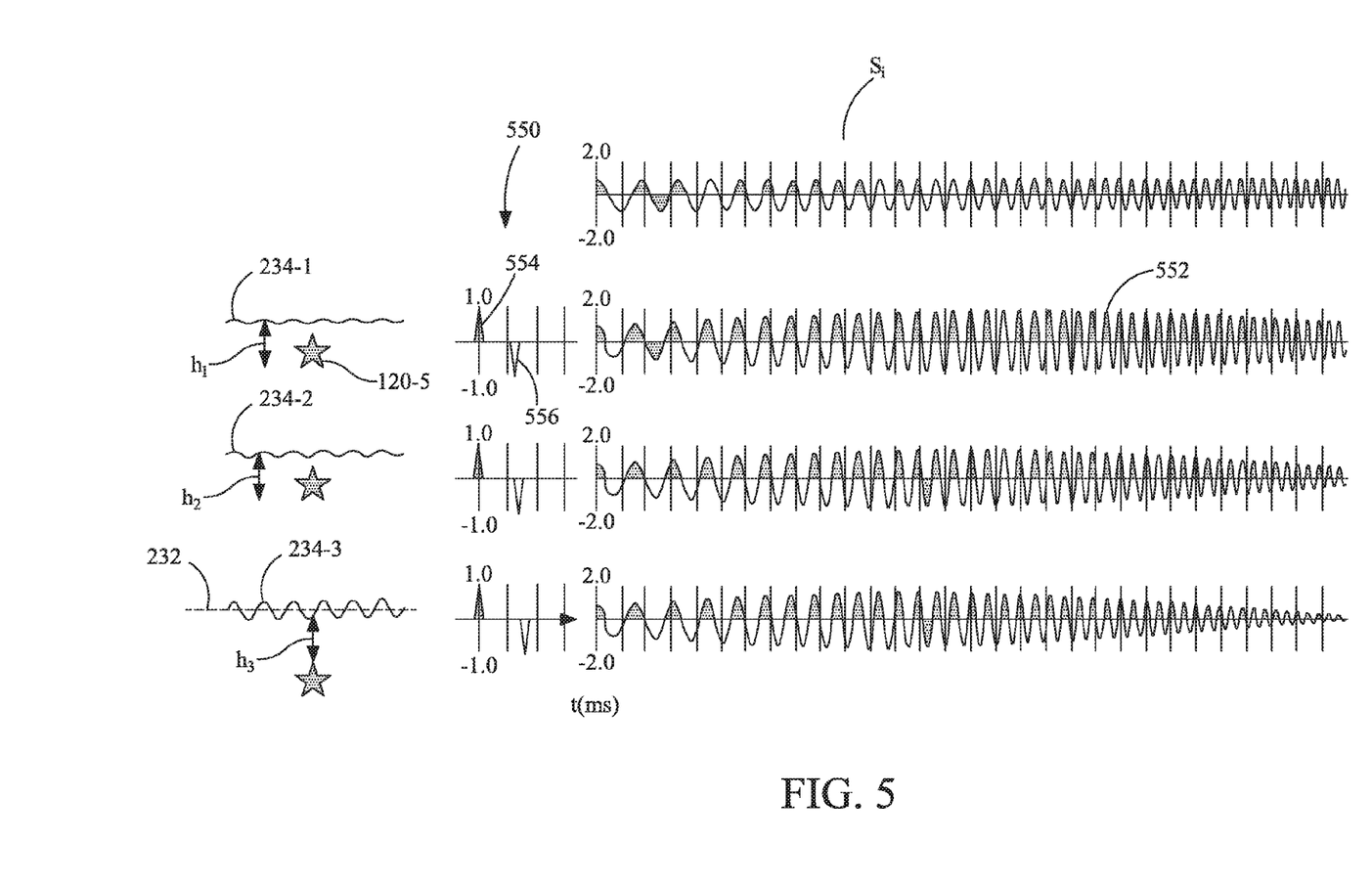
FIG. 5 illustrates how the composite far-field signature is calculated for various air-water interface datums.

The ghost signal g calculated in equation (2) may be combined with the primary signal p calculated in equation (1) to form the composite far-field signature ($f_c$=p+g) for the seismic source array. This approach may be used to calculate the far-field signatures corresponding to a given emission $S_i$, and a defined sea datum 234-1, 234-2 or 234-3, as schematically illustrated in FIG. 5. In FIG. 5, $S_i$ is the source emission for a linear sweep of a single marine vibrator source element that emits from 5 to 25 Hz, element 550 is a ghost operator (which may be calculated, for example, to have a 'primary part' which is the Dirac delta function at time zero, followed by a 'ghost part,' which is the reverse polarity Dirac delta function at a later time), and element 552 is the vertical far-field signature for this vibrator source element. The ghost part is also called the free surface reflection operator. The free surface reflection operator may be calculated, for a seismic source displaced in water, based on a position of the source, and an air-water interface datum (see, for example, U.S. Patent Application Publication No. 2014/0043936, assigned to the assignee of this application).

The ghost operator may be generated in the same way as described earlier for estimating the far-field signature, with the exception that the source emission (for example in equations (1) and (2)) are given by Dirac functions.

The far-field signature in this case is the convolution of the ghost operator 550 with the source element emission $S_i$. Note that ghost operator 550 includes a primary part 554 that accounts for the primary signal arriving from the vibrator source element and a ghost part 556 that accounts for the ghost signal arriving from the vibrator source element. As the source element 120-s is located at a larger depth h (in this example, h1 is about 24 m, h2 is about 27 and h3 is about 30 m) relative to the mean sea level 232, the ghost signal arrives later in time than the primary signal, which is illustrated in the figure by the ghost part 556 being positioned later on the time axis than the primary part 554.

The three scenarios illustrated in FIG. 5 and corresponding to depths h1 to h3, indicate that initially there are mild waves and the source element is at h1 below the mean sea level, than, after some minutes or hours, there are medium waves (their height is higher than for the mild waves) and the source element is at h2, and even later in time, there are strong waves (their height is higher than for the medium waves) and the source element is at depth h3. As the depths of the source element change in time, the shape of the vertical far-field signature 552 changes. In this example, the source position has remained static (relative to the Geoid) as a function of time, and the sea surface above the source has moved upwards, for example, due to a long wavelength swell.

In other words, as the signal $S_i$ emitted by the source element 120-s propagates downwards to form the primary, it also propagates upwards and after reflection at the air-water interface forms the ghost. An increase in the average source depth may result in an increase in the ghost delay, as shown by the ghost operators. In addition, simplistically speaking, an increase in air-water interface roughness (i.e., stronger waves) may result in partial scattering of the ghost energy, resulting in reduced ghost signal magnitude. As discussed above, the convolution of the ghost operator 550 with the emission signal $S_i$ forms the vertical far-field signature 552. The resulting far-field signatures 552 (from each source element 120-s) are different due to the fact the different ghost operators have boosted the emitted energy (at amplitude 1) to varying extents, but also attenuated the signal at different frequencies/times.

Figure 6:
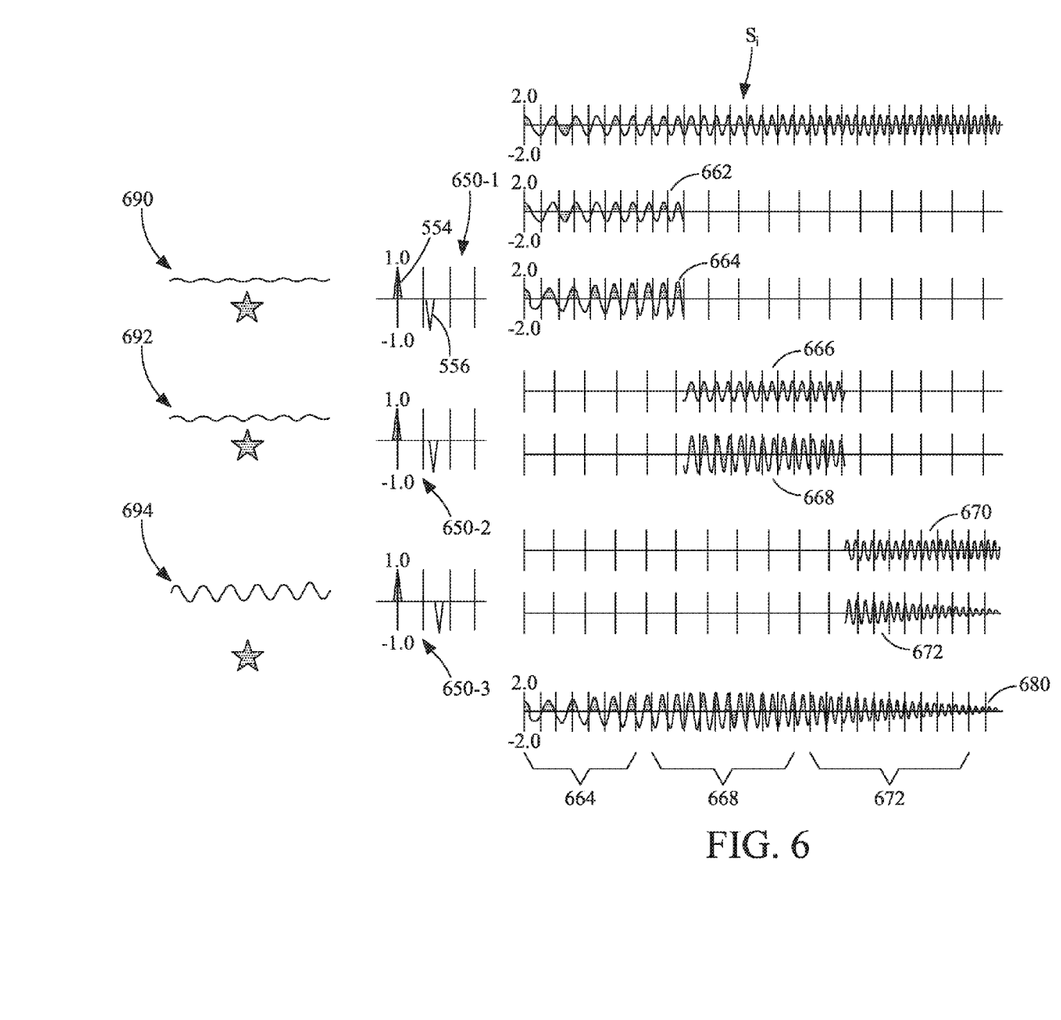
FIG. 6 illustrates how the composite far-field signature is calculated when the air-water interface datum varies substantially during the emission time.

According to an embodiment, in the case the air-water interface significantly varies (e.g., at least 25 cm relative to the mean sea level) during the emission time of the source array, the emission may be split into a number of emission segments. The emission segments may be short enough so that the air-water interface may be considered stationary for each segment. The emission segments may be a sample long, in which case the air-water interface is allowed to change, for example, every 2 ms or 4 ms. In practice, such short segments will be unnecessary, and segments between 100 ms and 2000 ms may be practical for most applications. The far-field signature for each segment may be calculated separately (for example, as discussed above), and the result of each segment may be summed with the results from the other segments to form the composite far-field signature. This approach is illustrated in FIG. 6, in which emission segment 662 of signal $S_i$, generated by the vibrator source element 120-s, is convoluted with ghost operator 650-1, which results in a first far-field segment 664. Emission segment 666 of signal $S_i$, when convoluted with ghost operator 650-2, results in a second far-field segment 668.

Emission segment 670 of signal $S_i$, when convoluted with ghost operator 650-3, results in a third far-field segment 672. When the three far-fields segments 664, 668 and 672 are combined, it results in composite far-field signature 680.

In the embodiment illustrated in FIG. 6, a 3 s linear sweep from 5 Hz to 25 Hz, for a single source element, was considered. The emission signal $S_i$ was split into three segments 662, 666, and 670, each of one second in length. It is assumed that the wave datum (or air-water interface shape 690, 692, and 694) is known for each segment, and that the wave datum can be considered to be stationary for the duration of that segment. In this embodiment, the sea state changes from a mild amplitude sinusoid 690 during the first segment 662, with a 24 m source depth, through a medium amplitude sinusoid 692 for the second segment 666, with a 27 m source depth, into a strong wave surface 694, in the final segment 670, with a 30 m source depth. This scenario is likely an exaggeration of what would happen in a real acquisition situation, but is useful for explanation purposes. It is also assumed in this embodiment that the position and depth of the source elements in the source array are fixed for the duration of any given segment.

In this case, the source element's depth becomes progressively deeper with the increase in the emission time. Using one of the aforementioned schemes (e.g., wave equation modelling, diffraction modelling, analytical solution), a ghosting operator (650-1 to 650-3) is calculated based on each wave datum and source element position. Then, each emission segment is convolved with its respective ghosting operator (e.g., emission segment 662 is convolved with ghost operator 650-1 to generate far-field segment 664) and the results of all these convolutions are summed together to find the composite vertical far-field signature $f_c$.

Although the segments 662, 666 and 670 above have no overlap, it is also possible to use an overlap and taper between them to transition slowly between these segments. In practice, a taper may be applied to the emission segments before or after convolution with the ghost operator. In reality, the composite far-field signature will also vary with a take-off angle, and as necessary, this procedure should be repeated for a variety of take-off angles and/or azimuths.

Instead of using a single source element as illustrated in FIG. 6, a source array may be used. In this case, the above considerations may be repeated for each source elements, and the results combined to obtain the composite far-field signature.

In one application, the primary part of the ghost operator may be further modified to include a Doppler shift relating to a motion of the source element, which may be vertical (for example, when suspended from floats on an air-water interface that is changing) or horizontal (e.g., due to towing). The ghost operator may also optionally be modified based on the Doppler shift relating to a moving air-water interface.

Irrespective of how the composite far-field signature is calculated, it may then be used to compensate the recorded seismic data. For example, in the case of a stationary source array, this may relate to a simple source designature (i.e., correlation or deconvolution of the recorded seismic data with the composite far-field).

In another embodiment, the composite far-field signature may be used in an inversion approach to find a model representation "p" of a ghost free impulsive source data. More specifically, seismic data d(f) for a given frequency f (this means that the recorded seismic data d, which is typically recorded in the time domain, has been transformed to the frequency domain d(f) through, for example, a Fourier transform) can be related to the energy S that left the source element and to the source element position h as a function of time, so that:

$$d(f) = \sum_{j=0}^{N}\left[e^{-2\pi i f j \Delta t} \sum_{m=1}^{M} S(j, m, f) p(m, f) e^{-2\pi i f h(j) s(m)}\right] \quad (3)$$

where
f Frequency (Hz),
j Source element emission sample index,
S(j, f) Source element emission, function of emission sample index and frequency.
This may relate to the source element energy in the vertical direction or another direction,
$\Delta t$ Source emission sample rate (seconds),
h(j) Source-receiver offset as a function of emission sample (e.g., $h(j)=vj\Delta t$),
m Tau-p model trace index,
s(m) Slowness of $m^{th}$ tau-p model trace (s/m),
p(m, f) Frequency domain tau-p model; function of model trace and frequency.

Equation (3) relates the recorded seismic data d for a given frequency f to the energy S that left the source element at a given angle (slowness m), and to the source position h as a function of time. Based on equation (3), the inversion approach finds the model representation p, so that when the model p is convolved with the time and angle dependent emission signature S, reverse transformed using the term $e^{-2\pi i f h(j) s(m)}$ from equation (3), and combined with a time shift term $e^{-2\pi i f j \Delta t}$, also from equation (3), it results into a continuous recording, which means that the recorded data d is produced in a least squares sense. This approach finds a model of stationary impulsive source data, so that when the continuous source emission data is encoded, this embodiment reverse engineers the recorded data. The resulting model p may then be used to output equivalent impulsive source data, or to correct the data for one or more of the following:
  Source position (e.g., x, y, or z),
  Source array effect,
  Deblending (separating signals relating to one or more sources),
  Free surface reflection, and
  Emission signal (designature).

The water-air interface shape 234 discussed with regard to FIGS. 2 and 3 may be obtained in several ways:
  Measurements from high frequency pingers and receivers mounted on one or more source elements,
  Low frequency component of hydrophone recordings mounted on each source element (this pressure measurement may describe a change in hydrostatic pressure relating to the air-water interface),
  Satellite mapping,
  GPS,
  Measurements from buoys or floats floating above the source (e.g., GPS), and
  Inferred wave height from receiver ghost delays.

As discussed in the above embodiments, the source ghost reflections may vary as the profile of the water-air interface varies. The source ghost reflection may change during a non-impulsive emission, for example, by a marine vibrator. Thus, according to the embodiment illustrated in FIG. 7, a method to compensate for these effects is now discussed. The method includes a step 700 of receiving a source position as a function of time. The source position can be the position of a source array and/or the position of each source element that is part of the source array. The position of the source elements or source array may be determined by a variety of methods, as discussed above. The source array includes plural source elements. The source elements may be vibratory source elements or impulsive source elements. If impulsive source elements are used, they are fired in a popcorn manner, and the method may also receive the firing times for the plural source elements.

Figure 7:
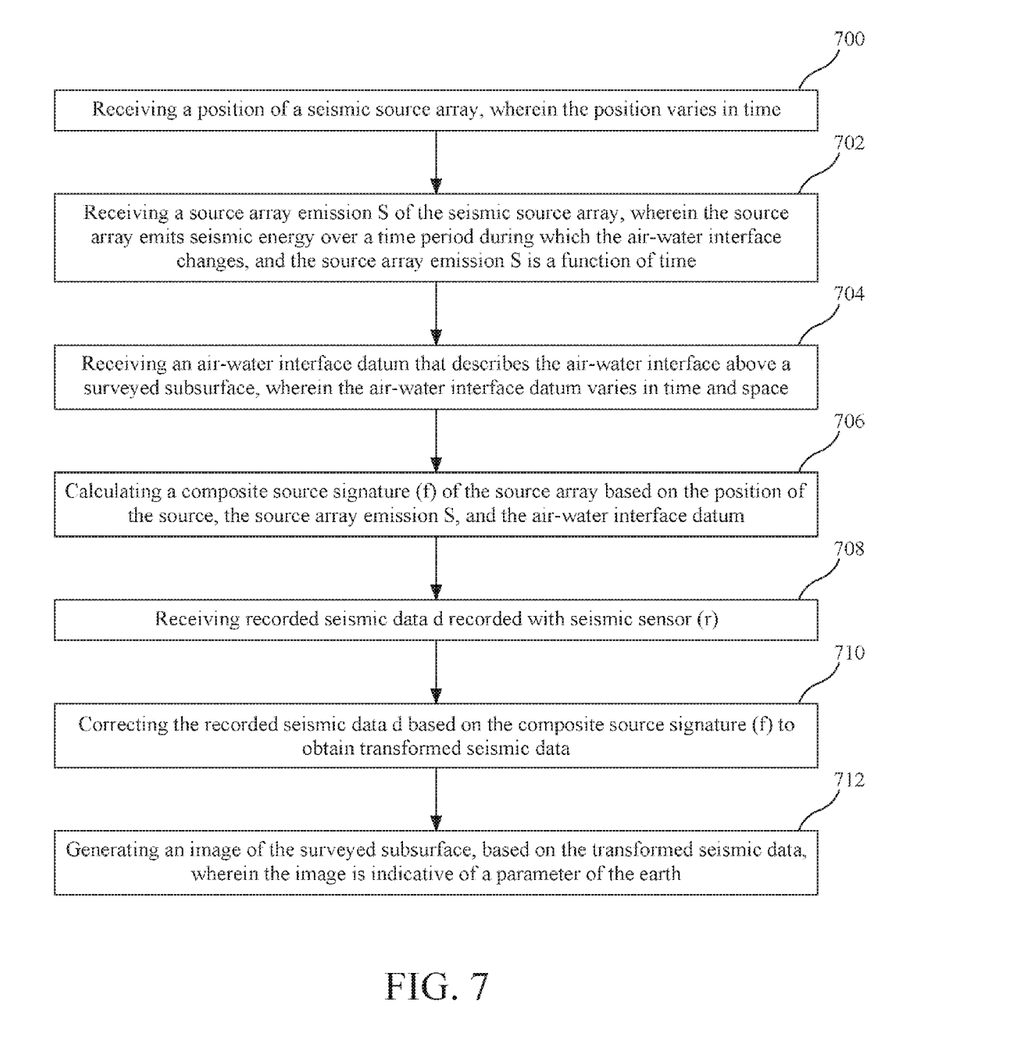
FIG. 7 is a flowchart of a method for correcting seismic data for a variable air-water interface.

The method further includes a step 702 of receiving a source emission S as a function of time, where the source emission S may include individual components $S_i$ for each source element "i" that is part of the source array. The source emission may be measured with a sensor located next to the source, or it may be obtained from the specifications of the source array. The source array emits seismic energy over a time period during which the air-water interface changes.

The method further includes a step 704 of receiving an air-water datum characteristic as a function of time and space. The air-water datum, also known as the air-water interface shape, has been discussed above with regard to FIGS. 2 and 3. The received characteristics describe the air-water datum interface either analytically or synthetically.

The method then advances to step 706, in which a computing device (e.g., processor) calculates a composite source array far-field signature relating to a source ghost using (i) the source array position received in step 700, (ii) the source array emission received in step 702, and (iii) the air-water datum received in step 704. This step 706 of calculating the source array composite far-field signature may include, as discussed in the embodiments of FIGS. 5 and 6, calculating the ghost operator, and convoluting the ghost operator with the emission S.

In step 708, the computing device receives the recorded seismic data. The recorded seismic data is recorded by at least one receiver that is either moved above a subsurface of interest, or is stationary located above or next to the surveyed subsurface. The recorded seismic data includes source ghost reflections due to the partial reflection of the emitted energy on the air-water interface.

In step 710, the computing device transforms the recorded seismic data to transformed seismic data, by compensating for the source ghost reflection using the composite far-field signature calculated in step 706. The process of compensating may include (i) removing the source ghost reflection from the recorded seismic data, (ii) converting the source ghost reflection to be consistent with a source ghost reflection from another seismic survey, (iii) converting the source ghost reflection to be consistent with a stationary air-water interface (e.g., horizontal), or another correction. Each of this processes increases the accuracy with which the transformed seismic data characterize the geological parameters of the surveyed subsurface.

In step 712, the transformed seismic data is used to generate an image of the surveyed subsurface. The image represents a geological parameter of the earth characterizing the surveyed subsurface. This parameter may be the earth's reflectivity, impedance, velocity, amplitude versus offset (AVO) (AVO or amplitude variation with offset is the general term for referring to the dependency of the seismic attribute, amplitude, with the distance between the source and receiver (the offset)), etc. The steps discussed with regard to FIG. 7 may be performed in a different order. In one application, less steps may be used to achieve the above-noted image.

This image is essential for many reasons to the oil and gas industry. One reason is the selection of a site for drilling a well. An accurate image of the subsurface provides clues to the location of the resource (e.g., oil and/or gas) and thus, suggests to those skilled in the art where to drill the well. Another reason is related to the monitoring of an existing production well. It is known that the production wells slowdown in time and thus, it is necessary to inject various fluids to rejuvenate the well production. The images discussed above may be used to monitor the production well, and these images will offer clues about the timing for injecting the above noted fluids, and also in which well to inject them.

The method may also include calculating a ghost operator that takes into consideration the position of the source and the air-water interface datum 234 and convoluting the ghost operator with the source array emission S to obtain the composite far-field signature. The step of calculating the ghost operator may include dividing the source emission S in plural segments, each segment corresponding to a fraction of the emission time period, and calculating a corresponding ghost operator for each of the plural segments. The air-water interface datum is stationary during the fraction of the emission time period.

The method further may include removing a source ghost reflection from the recorded seismic data, and/or converting a source ghost reflection present in the recorded seismic data to be consistent with a source ghost reflection from another seismic survey and/or converting the source ghost reflection in the recorded seismic data to be consistent with a stationary air-water interface.

According to another embodiment, a method for correcting an image, of a surveyed surface, due to a free-surface reflection is now discussed. The method includes a step of calculating (see, e.g., step 706 in FIG. 7) a free surface reflection operator for a seismic source displaced in water based on a position of the source, and an air-water interface datum, a step of receiving (see, e.g., step 708 in FIG. 7) recorded seismic data d recorded with seismic sensors (r), wherein the recorded seismic data is associated with a pressure and/or a particle motion produced by a seismic wave in earth, a step of correcting (see, e.g., step 710 in FIG. 7) the recorded seismic data d based on the free surface reflection operator to obtain transformed seismic data; and a step of generating (e.g., see step 712 in FIG. 7) an image of the surveyed subsurface, based on the transformed seismic data, wherein the image is indicative of various layers of the earth. The free surface reflection operator varies while a source signal is being emitted by the source.

The method may further include a step of convolving the free surface reflection operator with a source emission S to obtain a far-field signature of the source and using the far-field signature to correct the recorded data, and/or combining free surface reflection operators from more than one source element in a source array to calculate a composite source side free surface reflection operator, and/or compensating for the source array based on the composite source side free surface reflection operator.

The step of calculating the free surface reflection operator may include dividing the source emission S into plural segments, each segment corresponding to a fraction of a time period during which a source element of the source array sweeps and calculating a corresponding free surface reflection operator for each of the plural segments. The air-water interface datum is stationary during the fraction of the time period. The method may further include a step of receiving the position of the seismic source, wherein the position varies in time; a step of receiving the seismic source emission S of the seismic source, wherein the seismic source emits seismic energy over the time period during which the air-water interface changes, and the source emission S is a function of time; and a step of receiving the air-water interface datum that describes the air-water interface above a surveyed subsurface, wherein the air-water interface datum varies in time and space. The seismic source includes plural individual source elements.

The step of correcting may include a step of removing a source ghost reflection from the recorded seismic data, or a step of converting a source ghost reflection present in the recorded seismic data to be consistent with a source ghost reflection from another seismic survey, or a step of converting a source ghost reflection present in the recorded seismic data to be consistent with a stationary air-water interface.

In one application, a source emission S of the seismic source varies continuously over the time period. The source emission S may include source element emissions for each source element of the seismic source. The seismic source may include plural air guns that are fired in a popcorn manner.

In one application, the source emission S varies continuously over the time period. In still another application, the source array emission S includes source element $S_i$ emissions for each source element of the source array and the source array is a marine source array including plural vibrators that sweep a given frequency range (e.g., 5 to 25 Hz). In one embodiment, the time period is about 10 s. Still in another embodiment, the time period is larger than 5 s. In yet another embodiment, the source array includes plural air guns that are fired in a popcorn manner.

The embodiments discussed above may use various types of seismic data, e.g., hydrophone data (i.e., data collected with hydrophones), particle movement data (i.e., data collected with accelerometers) or data collected with other type of sensors. The methods discussed above may use single component seismic data, i.e., seismic data indicative of a single parameter of the subsurface, e.g., pressure or vertical motion, or cross-line motion or inline motion, etc. However, the above embodiments can also be applied to multi-component seismic data, i.e., seismic data indicative of two or more parameters of the wave-field, e.g., pressure and vertical motion, pressure and cross-line motion, or vertical motion and inline motion, etc.

The following comments and observations apply to any of the above embodiments. The methods discussed above may be used to extend most of the known deghosting methods. The methods may be applied in a number of different domains, e.g., space-time, fx domain, tau-p domain, FK domain, NMO, etc.

The methods discussed above may also be used to improve multiple attenuation by modifying a multiple prediction operator. Multiple prediction operators are convolved with data to estimate multiples and are widely used in seismic processing. One example is a predictive deconvolution operator which may be applied in one or higher dimensions. One example of a 2D operator is given by Hung et al., 2010, "Shallow water demultiple," Australian Society of Exploration Geophysicists conference. Another example using a Green's function relating to a known multiple generator is given by Wang et al., 2011, "Model-based water-layer demultiple," $81^{st}$ SEG annual conference. Another example is outlined in Poole, G., and Cooper, J, 2015, Inversion-driven free-surface multiple modeling using multiorder Green's functions, SEG conference proceedings. A final example is that of SRME where data is convolved with a primary estimate (initially the data itself) to predict multiples. These and other similar approaches assume a flat air-water interface. A known air-water interface datum may be used to modify the multiple prediction operator (for example with a time shift or convolution) before convoluting with the data. In particular, this may relate to the processing of an up-going or a down-going wave field by applying a time shift to a trace or an operator (e.g., deconvolution operator or Green's function), where the time shift is based on a wave height.

Correcting for the variable air-water interface may be important for time lapse processing. It is possible to compensate for air-water interface changes on a base and/or a monitor dataset, modify the ghost timing of a monitor survey to match the base, or modify the ghost timing of a base survey to match a monitor survey. Likewise, removing the ghost from the base and monitor survey using variable air-water interface information will result in the up-going wavefields from base and monitor being more closely matched, for example, measured by NRMS. The scheme may also include a receiver motion or a source motion correction. In some cases, data from a first dataset will be used to remove multiples from a second dataset. In this case, a ghost operator may be applied to encode a wave height on to a multiple model calculated on a first dataset to match waves on a second dataset.

The source and/or sensors discussed above may be moving or stationary. Input data may relate to land, marine, or transition zone data. Particle motion data may consist of accelerometers, differential pressure, particle motion, particle velocity, or other particle motion data. Seismic sources may relate to pingers, boomers, airguns, marine vibrators, dynamite, weight drop, VibroSeis or another source.

Figure 8:
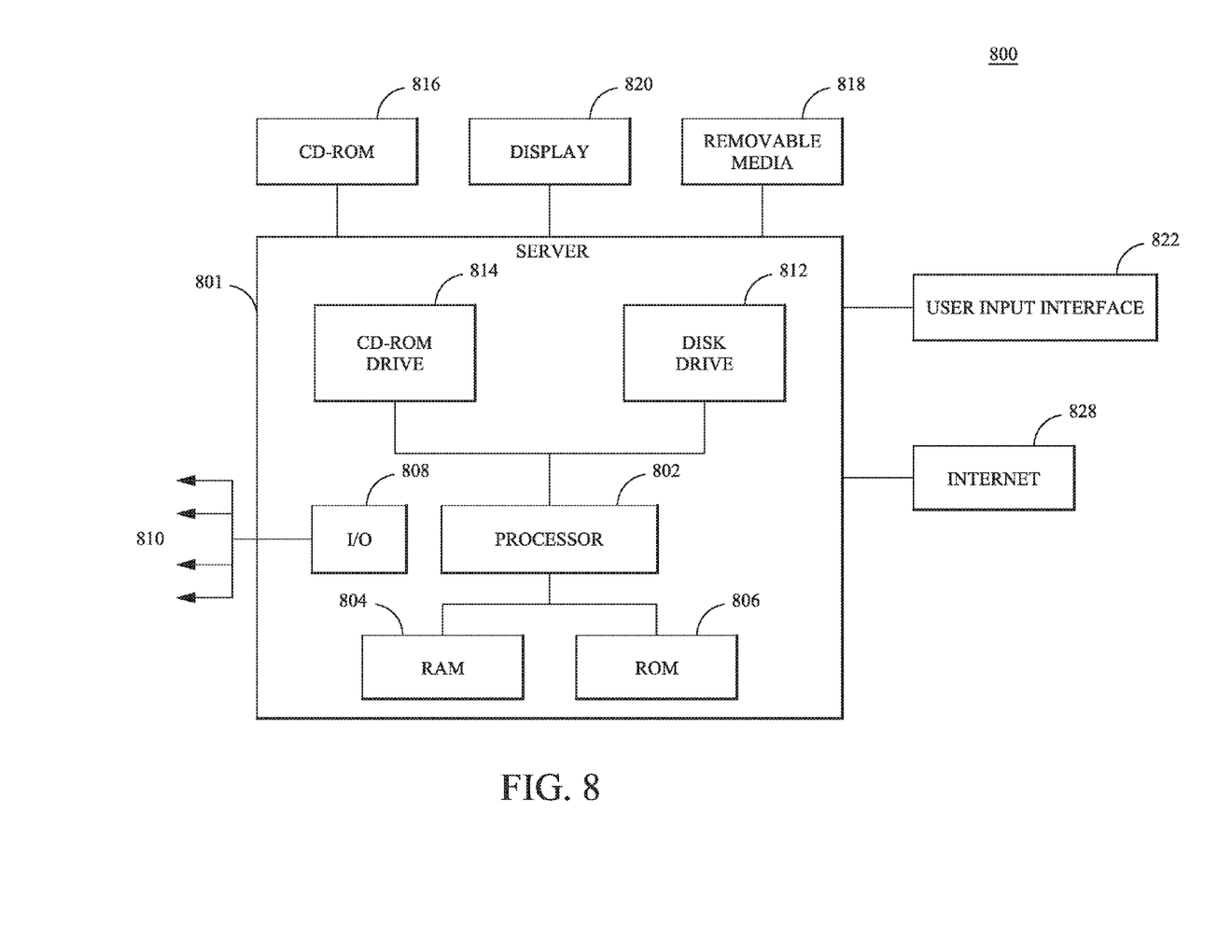
FIG. 8 is a schematic diagram of a computing device configured to implement any of the above methods.

The above-discussed procedures and methods may be implemented in a computing device illustrated in FIG. 8. Hardware, firmware, software or a combination thereof may be used to perform the various steps and operations described herein.

The computing device 800 suitable for performing the activities described in the exemplary embodiments may include a server 801. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as are known in the art, as dictated by software and/or firmware instructions.

The server 801 may also include one or more data storage devices, including hard drives 812, CD-ROM drives 814, and other hardware capable of reading and/or storing information such as DVD, etc. In one embodiment, software for carrying out the above-discussed steps may be stored and distributed on a CD-ROM or DVD 816, a removable storage device 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to the various landline and/or mobile computing devices. In one embodiment, the computing device 800 is a dedicated machine that is configured to execute teraflops of operations on hundreds if not thousands of cores.

The disclosed embodiments provide a computing device and a method for correcting recorded seismic data for a variable air-water interface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method comprising:
    receiving recorded seismic data d acquired by seismic sensors detecting a seismic signal S emerging from a surveyed subsurface, wherein the recorded seismic data includes pressure and/or particle motion traces;
    receiving a position of a seismic source emitting the seismic signal S for an emission time interval, and an air-water interface datum that varies in time and space above the seismic source during the emission time interval;
    transforming the recorded seismic data d using the position of the seismic source and the air-water interface datum thereby obtaining transformed seismic data; and
    generating an image of the surveyed subsurface, based on the transformed seismic data, wherein the image is indicative of various layers of the surveyed subsurface and enables determining presence of natural resources.

2. The method of claim 1, wherein the transforming includes:
    calculating a free surface reflection operator corresponding to the position of the seismic source and the air-water interface datum;
    convolving the free surface reflection operator with the seismic signal S to obtain a far-field signature of the seismic source; and
    using the far-field signature to extract a response of the surveyed subsurface from the recorded seismic data.

3. The method of claim 2, wherein the step of calculating the free surface reflection operator comprises:
    dividing the seismic signal S into plural segments, each segment corresponding to a fraction of the emission time interval, during which fraction, a source element of the seismic source sweeps and the air-water interface datum is stationary; and
    calculating free surface reflection operators for the plural segments, respectively.

4. The method of claim 1, further comprising:
    combining the free surface reflection operators from more than one source element of the seismic source to calculate a composite source side free surface reflection operator; and
    compensating for the seismic source using the composite source side free surface reflection operator.

5. The method of claim 1, wherein the seismic source includes plural individual source elements.

6. The method of claim 1, wherein the step of transforming comprises:
    converting a source ghost present in the recorded seismic data to be consistent with a source ghost reflection from another seismic survey.

7. The method of claim 1, wherein the step of transforming comprises:
    converting a source ghost reflection present in the recorded seismic data to be consistent with a stationary air-water interface.

8. The method of claim 1, wherein the seismic signal S varies continuously over the emission time interval.

9. The method of claim 1, wherein the seismic signal S includes source element emissions for each source element of the seismic source.

10. The method of claim 9, wherein the seismic source includes plural air guns that are fired in a popcorn manner.

11. A computing device for seismic exploration, the computing device comprising:
    an interface configured to receive
        recorded seismic data d acquired by seismic sensors detecting a seismic signal S emerging from a surveyed subsurface, wherein the recorded seismic data includes pressure and/or particle motion traces,
        a position of a seismic source emitting the seismic signal S for an emission time interval, and
        an air-water interface datum that varies in time and space above the seismic source during the emission time interval; and
    a processor connected to the interface and configured to
        transform the recorded seismic data d using the position of the seismic source and the air-water interface datum thereby obtaining transformed seismic data; and
    generate an image of the surveyed subsurface, based on the transformed seismic data, wherein the image is indicative of various layers of the surveyed subsurface and enables determining presence of natural resources.

12. The computing device of claim 11, wherein the processor is further configured to:
    calculate a free surface reflection operator corresponding to the position of the seismic source and the air-water interface datum,
    convolve the free surface reflection operator with the seismic signal S to obtain a far-field signature of the seismic source, and
    use the far-field signature to extract a response of the surveyed subsurface to the seismic signal from the recorded seismic data.

13. The computing device of claim 12, wherein the processor is further configured to:
    divide the seismic signal S into plural segments, each segment corresponding to a fraction of the emission time interval, during which fraction, a source element of the seismic source sweeps and the air-water interface datum is stationary, and calculate free surface reflection operators for the plural segments, respectively.

14. The computing device of claim 11, wherein the processor is further configured to:

combine the free surface reflection operators from more than one source element of the seismic source to calculate a composite source side free surface reflection operator; and compensate for the seismic source using the composite source side free surface reflection operator.

15. The computing device of claim 11, wherein the processor is further configured to:

convert a source ghost reflection present in the recorded seismic data to be consistent with a source ghost reflection from another seismic survey, or convert a source ghost reflection present in the recorded seismic data to be consistent with a stationary air-water interface.

16. The computing device of claim 11, wherein the seismic source includes plural individual source elements, and the seismic signal S includes source element emissions for each source element of the seismic source.

17. The computing device of claim 11, wherein the seismic signal varies continuously over the emission time interval.

18. A non-transitory computer readable medium including computer executable instructions, wherein the instructions, when executed by a processor, implement instructions determining the processor to:

receive recorded seismic data d acquired by seismic sensors detecting a seismic signal S emerging from a surveyed subsurface, wherein the recorded seismic data includes pressure and/or particle motion traces, receive a position of a seismic source emitting the seismic signal S for an emission time interval, and an air-water interface datum that varies in time and space above the seismic source during the emission time interval, transform the recorded seismic data d using the position of the seismic source and the air-water interface datum thereby obtaining transformed seismic data, and generate an image of the surveyed subsurface, based on the transformed seismic data, wherein the image is indicative of various layers of the surveyed subsurface and enables determining presence of natural resources.

19. The non-transitory computer readable medium of claim 18, where in the instructions further determine the processor to calculate a free surface reflection operator corresponding to the position of the seismic source and the air-water interface datum, convolve the free surface reflection operator with the seismic signal S to obtain a far-field signature of the seismic source, and use the far-field signature to extract a response of the surveyed subsurface to the seismic signal from the recorded seismic data.

20. The non-transitory computer readable medium of claim 18, where in the instructions further determine the processor to divide the seismic signal S into plural segments, each segment corresponding to a fraction of the emission time interval, during which fraction, a source element of the seismic source sweeps and the air-water interface datum is stationary, and calculate free surface reflection operators for the plural segments, respectively.

* * * * *